(12) United States Patent
Mills

(10) Patent No.: US 8,701,426 B2
(45) Date of Patent: Apr. 22, 2014

(54) ENHANCED BOILER

(75) Inventor: Frank E. Mills, Altadena, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 219 days.

(21) Appl. No.: 13/097,037

(22) Filed: Apr. 28, 2011

(65) Prior Publication Data

US 2012/0272671 A1 Nov. 1, 2012

(51) Int. Cl.
| | |
|---|---|
| *F25B 15/00* | (2006.01) |
| *F25B 15/16* | (2006.01) |
| *B60H 1/32* | (2006.01) |
| *B60H 1/00* | (2006.01) |

(52) U.S. Cl.
USPC ........... 62/112; 62/109; 62/239; 62/244; 62/268; 62/477; 62/485; 62/494; 165/41; 165/42; 165/43; 165/104.12; 165/104.26; 165/907; 165/136

(58) Field of Classification Search
CPC ..... B60H 1/3201; F25B 15/025; F25B 15/10; F28D 2021/0021; F28D 2021/0024; Y02B 30/10; Y02B 30/12
USPC ........ 62/112, 109, 239, 244, 259.4, 268, 269, 62/476, 477, 480, 485, 478, 304, 315, 62/316; 165/104.12, 104.26, 907
See application file for complete search history.

(56) References Cited

U.S. PATENT DOCUMENTS

| | | | | |
|---|---|---|---|---|
| 3,294,644 | A * | 12/1966 | Walton | 376/306 |
| 4,581,049 | A * | 4/1986 | Januschkowetz | 96/126 |
| 4,838,885 | A * | 6/1989 | Bernardin | 604/385.22 |
| 6,584,797 | B1 * | 7/2003 | Smith et al. | 62/371 |
| 2003/0033829 | A1 * | 2/2003 | Smith et al. | 62/480 |
| 2006/0089073 | A1 * | 4/2006 | Sobieski | 442/394 |
| 2006/0112706 | A1 * | 6/2006 | Inoue et al. | 62/238.3 |
| 2007/0095096 | A1 * | 5/2007 | DiFoggio et al. | 62/480 |
| 2008/0023181 | A1 * | 1/2008 | Dunne et al. | 165/133 |
| 2009/0095097 | A1 * | 4/2009 | Wadell | 73/866.5 |
| 2010/0051237 | A1 * | 3/2010 | Frey et al. | 165/104.21 |
| 2011/0005246 | A1 * | 1/2011 | Buttner et al. | 62/112 |
| 2011/0096503 | A1 * | 4/2011 | Avery et al. | 361/701 |

* cited by examiner

*Primary Examiner* — Frantz Jules
*Assistant Examiner* — Erik Mendoza-Wilkenfel
(74) *Attorney, Agent, or Firm* — McDermott Will & Emery LLP

(57) ABSTRACT

A method and apparatus for preventing loss of a cooling fluid from a boiler in an aircraft by incorporating an absorber material is provided. In some aspects, an apparatus may include a base section, a top section, a cooling fluid, and an absorber material disposed in the base section. The absorber material may be configured to retain the cooling fluid therein. The apparatus may further include a barrier disposed between the base and top sections. The barrier may be configured to retain the absorber material in the base section while allowing the cooling fluid to pass therethrough.

18 Claims, 2 Drawing Sheets

ENHANCED BOILER

STATEMENT AS TO RIGHTS TO INVENTIONS MADE UNDER FEDERALLY SPONSORED RESEARCH OR DEVELOPMENT

Not Applicable.

FIELD

The present invention generally relates to a boiler and, in particular, relates to a boiler with an absorber.

BACKGROUND

Boilers are used to provide cooling of fluids in an aircraft. Such fluids may include hydrocarbon fuel that is used to cool other components or systems in the aircraft. Before returning the hot hydrocarbon fuel to the fuel tank, the boiler is used to transfer the thermal energy from the hot hydrocarbon fuel to a cooling fluid in the boiler. Conventional cooling fluids include water. Water, however, may damage the boiler when it freezes and expands. Additionally, during aerial maneuvers or during vigorous boiling, water is typically lost when it flows out of the boiler through one or more of the boiler vents. A reduction in water in the boiler impedes the effectiveness of the boiler.

Conventional methods for preventing water from freezing involve the addition of ammonia to the cooling fluid. Ammonia, however, has a lower boiling point than water and typically "boils off," thereby reducing the effectiveness of its anti-freezing characteristics. Furthermore, the heat capacity of ammonia is less than water, thereby impeding the effectiveness of the boiler.

Conventional methods for preventing water loss through vents involves the use of baffles. Baffles, however, take up large amounts of space in an aircraft and are not completely effective.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects of the subject technology prevent the loss of a cooling fluid from a boiler in an aircraft by incorporating an absorber material in the boiler. By incorporating the absorber material in the boiler, the cooling fluid is retained in the boiler despite subjecting the cooling fluid to complex aerial maneuvers or vigorous boiling. Additionally, the absorber material may inhibit the cooling fluid from freezing.

In accordance with one aspect of the present invention, an enhanced boiler is provided. The boiler comprises a base section and a top section. The boiler further comprises a cooling fluid and an absorber material disposed in the base section. The absorber material is configured to retain the cooling fluid therein. The boiler further comprises a barrier disposed between the base and top sections. The barrier is configured to retain the absorber material in the base section while allowing the cooling fluid to pass therethrough.

According to another aspect of the present invention, a method for preventing loss of a cooling fluid in an aircraft is provided. The method comprises using a boiler to cool the aircraft with the cooling fluid. The boiler comprises a base section, a top section, an absorber material disposed in the base section, and a barrier disposed between the base and top sections. The barrier is configured to retain the absorber material in the base section while allowing the cooling fluid to pass therethrough. The method further comprises preventing loss of the cooling fluid by using the absorber to retain the cooling fluid in the base section of the boiler.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology prevent the loss of a cooling fluid from a boiler in an aircraft by incorporating an absorber material in the boiler. In one aspect, the boiler may comprise a base section, a top section, a cooling fluid, an absorber material, and a barrier. The absorber material is configured to absorb and retain the cooling fluid. The barrier may be configured to retain the absorber in the base section of the boiler while allowing the cooling fluid and vapor to flow therethrough. During filling of the boiler with the cooling fluid, the cooling fluid is poured into the top section of the boiler and flows from the top section, through the barrier, into the absorber material. By retaining the cooling fluid in the base section of the boiler, the absorber material prevents loss of the cooling fluid during complex aerial maneuvers or during vigorous boiling. Additionally, the absorber material may inhibit the cooling fluid from freezing.

Figure 1:
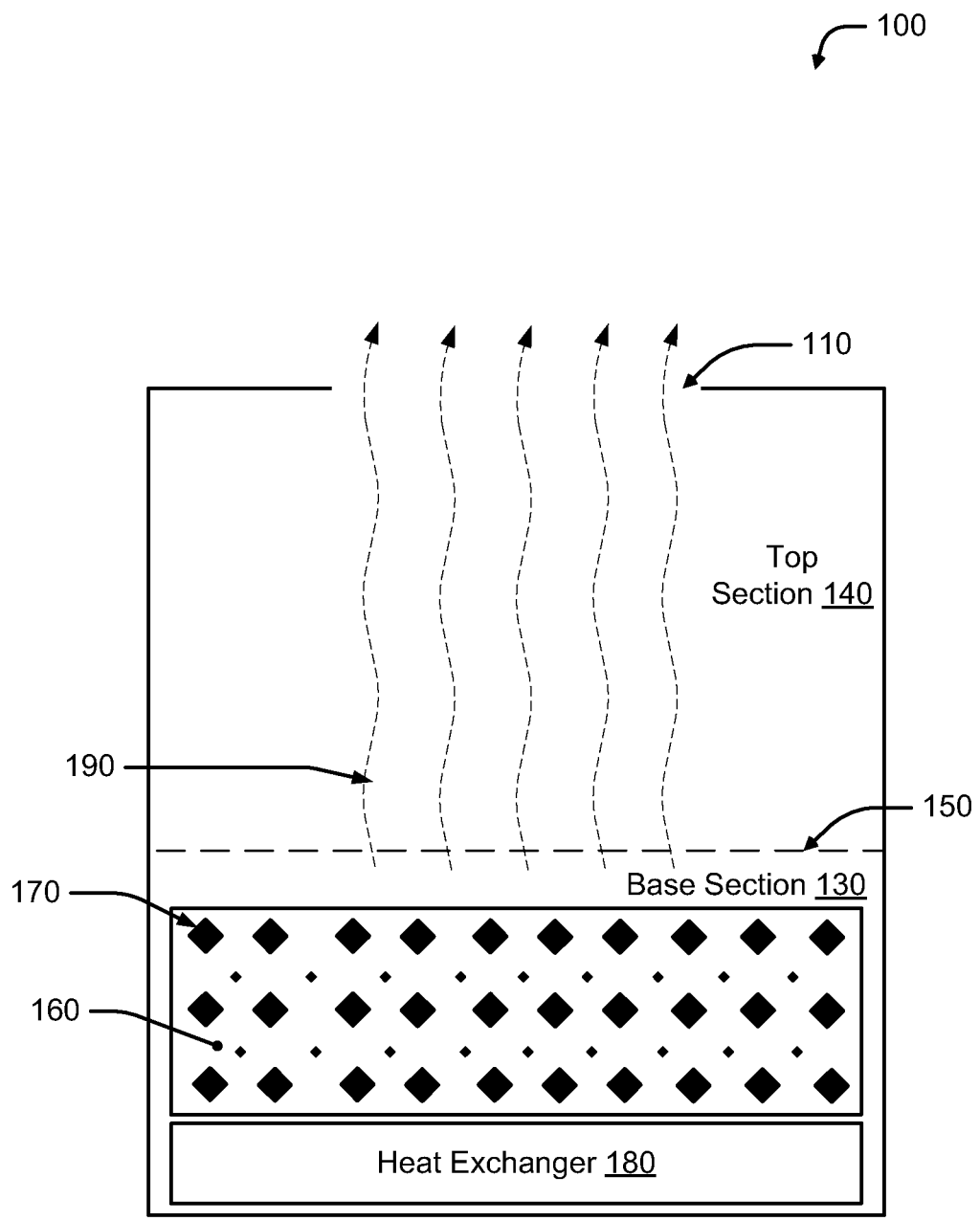
FIG. 1 is a block diagram illustrating a boiler, in accordance with various aspects of the subject technology.

FIG. 1 is a block diagram illustrating a boiler 100, in accordance with various aspects of the subject technology. The boiler 100 is configured to contain a cooling fluid for cooling a liquid or gas in an aircraft. The boiler 100 may comprise a base section 130 and a top section 140, and a barrier 150 disposed between the top section 140 and the base section 130. The base section 130 may be configured to contain an absorber material 170, which absorbs and retains the cooling fluid 160 in the base section 130. The top section 140 may be configured with a vent 110 for allowing a vapor 190 to escape the boiler 100. The vent 110 may also be configured to receive the cooling fluid for filling the boiler 100 with the cooling fluid. The barrier 150 may be configured to retain the absorber material 170 in the base section 130 while allowing the cooling fluid 160 to pass therethrough. For example, the barrier 150 may allow cooling fluid 160 poured into the top section to flow into the absorber material 170. In some aspects, the boiler 100 may comprise a heat exchanger 180 in thermal communication with the absorber material 170 and the cooling fluid 160 retained in the absorber material.

In some aspects, the cooling fluid 160 is configured to cool a hot liquid or gas in an aircraft by maintaining the cooling fluid 160 at a lower temperature than the hot liquid or gas. For example, the cooling fluid 160 may comprise water with a boiling temperature and the hot liquid may comprise hydrocarbon fuel at a temperature above the boiling temperature of the water. As the water 160 is subjected to the high temperature hydrocarbon fuel, the thermal energy from the hydrocarbon fuel is transferred to the water 160 through the heat exchanger 180, thereby increasing the temperature of the water 160. Upon reaching the boiling temperature of the water, the water 160 in the absorber material 170 maintains a relatively constant temperature despite continued transfer of thermal energy from the high temperature hydrocarbon fuel because some of the water boils off from the absorber material 170 as a vapor 190. The water 160, maintained at the relatively constant temperature, thereby cools the hydrocarbon fuel. Although in this example, the cooling fluid 160 is water, it is to be understood that the cooling fluid 160 may comprise other fluids, chemicals, media, additives, or combinations thereof, to achieve differing boiling temperatures and/or characteristics. For example, the cooling fluid 160 may comprise water mixed with ammonia. Adding ammonia to the water may lower the boiling temperature of the cooling fluid 160, and prevent freezing of the water at freezing temperatures.

In certain aspects of the subject technology, the absorber material 170 may comprise a synthetic polymer that is configured to absorb and retain the cooling fluid 160. For example, where the cooling fluid 160 is water, the water is absorbed and retained in the synthetic polymer through hydrogen bonding with the water molecules. Although the absorber material 170 comprises a synthetic polymer in the above example, it is to be understood that the absorber material 170 may comprise other materials, chemicals, media, additives, or combinations thereof, capable of absorbing and retaining the cooling fluid 160 and capable of withstanding high temperatures, such as temperatures exceeding 100° C.

For example, the absorber material 170 may comprise a synthetic polymer with a dispersant to aid absorption of the cooling fluid 160. The dispersant may comprise wood pulp (cellulose) to disperse the cooling fluid (e.g., water) throughout the polymer. The polymer may comprise a water-absorbing polymer that turns into a hydrogel upon absorbing water, with the hydrogel retaining the water during high-g maneuvers and vigorous boiling. The hydrogel may lock up the water in its molecular structure, thereby inhibiting freezing of the water.

In another example, the absorber material 170 may comprise at least one of sodium polyacrylate, acrylate, polyacrylamide copolymer, ethylene maleic anhydride copolymer, cross-linked carboxymethylcellulose, polyvinyl alcohol copolymers, cross-linked polyethylene oxide, starch grafted copolymer of polyacrylonitrile, and cellulose. In some aspects, the absorber material 170 may be in the form of a liquid, gel, granular, or a combination thereof. In one aspect, the absorber material 170 is configured to change form due to exposure to a high temperature. For example, the absorber material 170 may change from liquid form to granular form when subjected to a temperature exceeding 100° C.

In one aspect, the absorber material 170 may alter the characteristics of the cooling fluid 160. For example, the absorber material 170 may alter the boiling temperature of the cooling fluid 160. In some aspects, the absorber material 170 may lock the cooling fluid in its molecular structure to inhibit freezing of the cooling fluid 160.

In another aspect, the absorber material 170 may be configured to retain a cooling fluid 160 in a boiler 100 despite subjecting the cooling fluid 160 to boiling temperatures. For example, absorber material 170 may allow a vapor 190 to exhaust out of the boiler 100, but prevent loss of the cooling fluid 160 due to vigorous boiling by retaining the cooling fluid 160 in the absorber material 170. In one aspect, as the cooling fluid 160 is subjected to forces in various directions (e.g., due to high-g maneuvers), loss of the cooling fluid 160 is prevented because the cooling fluid 160 is retained in the absorber material 170.

In one aspect of the subject technology, the barrier 150 may be disposed between a vent 110 and the absorber material 170. For example, the barrier 150 may comprise a perforated sheet whereby the perforations are sized to allow the cooling fluid 160 and the vapor 190 to pass therethrough, but retain the absorber material 170 in the boiler 100. In one aspect, during filling of the boiler 100 with the cooling fluid 160, the perforations in the barrier 150 allow the cooling fluid to flow into the absorber material 170. In another aspect, the perforations in the barrier 150 are sized to allow the vapor 190 to exhaust out from the absorber material 170 to the vent 110.

In one aspect, the barrier 150 may comprise an envelope configured to retain the absorber material 170 therein. The envelope may, for example, comprise a hydrophilic material configured to retain the absorber material 170, to facilitate the cooling fluid 160 coming into contact with the absorber material 170, and to allow the vapor 190 to exhaust out from the absorber material 170. In some aspects the envelope may be directly attached to the boiler 100.

In some aspects, the boiler 100 may be configured to transfer thermal energy from a hot liquid or gas to the cooling fluid 160 using the heat exchanger 180. The heat exchanger 180 may, for example, be disposed in the base section 130 of the boiler 100. The heat exchanger 180 may be in thermal communication with the absorber material 170 and the cooling fluid 160 retained in the absorber material 170. For example, the heat exchanger 180 may be immersed in the absorber material 170. The heat exchanger 180 may be adapted for cooling a liquid (e.g., hydrocarbon fuel) or gas in the aircraft by transferring thermal energy from the liquid or gas to the cooling fluid 160 retained in the absorber material 170.

Figure 2:
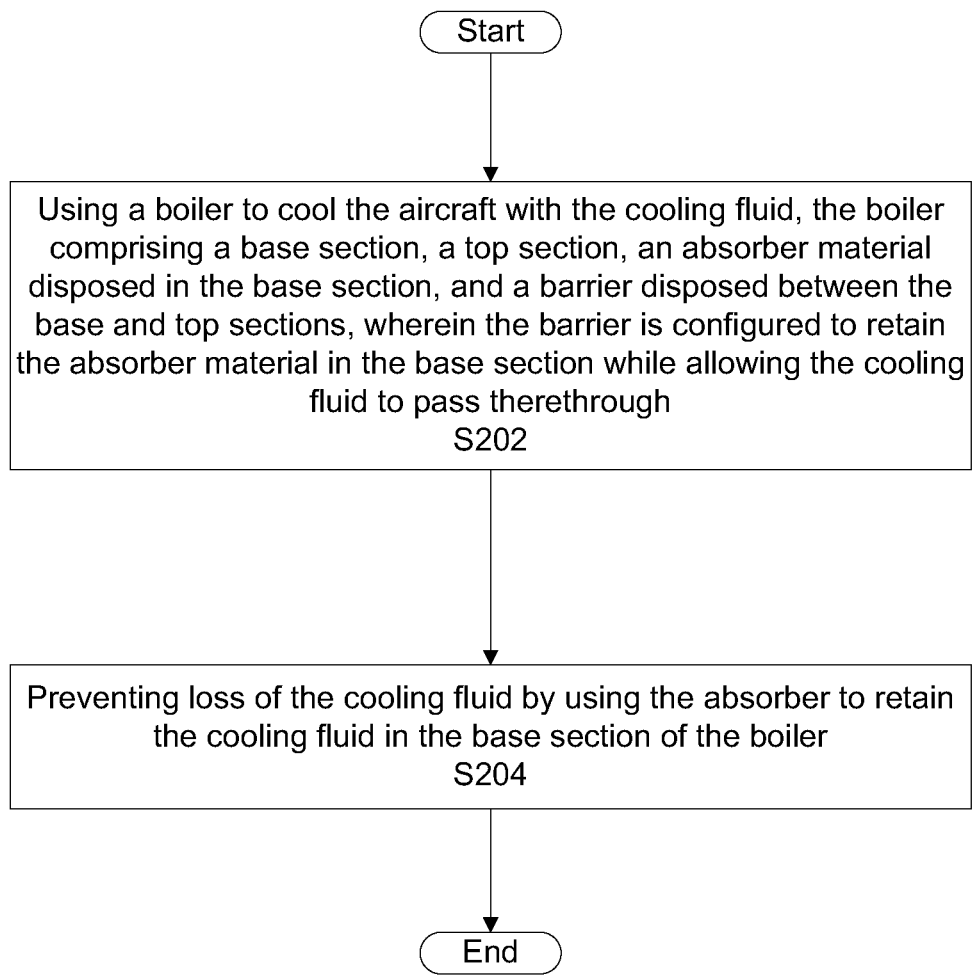
FIG. 2 illustrates an example of a method for preventing loss of a cooling fluid in an aircraft, in accordance with various aspects of the subject technology.

FIG. 2 illustrates an example of a method 200 for preventing loss of a cooling fluid in an aircraft, in accordance with various aspects of the subject technology. Method 200 comprises using a boiler to cool the aircraft with the cooling fluid (S202). The boiler comprises a base section, a top section, an absorber material disposed in the base section, and a barrier disposed between the base and top sections, wherein the barrier is configured to retain the absorber material in the base section while allowing the cooling fluid to pass therethrough.

The method further comprises preventing loss of the cooling fluid by using the absorber to retain the cooling fluid in the base section of the boiler (S204).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A boiler for an aircraft, comprising:
   a base section and a top section;
   a liquid cooling fluid;
   an absorber material disposed in the base section, wherein the absorber material comprises a hydrogel, synthetic polymer and a dispersant, the absorber material is configured to retain the cooling fluid therein, and the absorber material is configured to change from liquid form to granular form when subjected to a temperature exceeding 100° C.;
   a hydrophilic barrier disposed between the base and top sections, wherein the hydrophilic barrier is configured to retain a mixture of the liquid cooling fluid and the absorber material in the base section while allowing the cooling fluid and a vapor of the cooling fluid to pass therethrough; and
   a heat exchanger for transferring thermal energy of hot hydrocarbon fuel of the aircraft, the heat exchanger disposed in the base section and configured to facilitate thermal communication with the mixture of the cooling fluid and the absorber material.

2. The boiler of claim 1, wherein the liquid cooling fluid comprises water.

3. The boiler of claim 2, wherein the liquid cooling fluid further comprises ammonia.

4. The boiler of claim 2, wherein the liquid cooling fluid further comprises methanol.

5. The boiler of claim 1, wherein the absorber material comprises sodium polyacrylate.

6. The boiler of claim 1, wherein the absorber material comprises acrylate and cellulose.

7. The boiler of claim 1, further comprising a vent disposed in the top section.

8. The boiler of claim 1, wherein the heat exchanger is adapted for cooling a liquid form of the hot hydrocarbon fuel in the aircraft.

9. The boiler of claim 1, wherein the heat exchanger is adapted for cooling a gaseous form of the hot hydrocarbon fuel in the aircraft.

10. A method for preventing loss of a liquid cooling fluid in an aircraft, the method comprising:
    passing hot hydrocarbon fuel from the aircraft through a heat exchanger that is in thermal communication with a mixture of the liquid cooling fluid and an absorber material that is contained in a base section of a boiler, the boiler further comprising a top section and a hydrophilic barrier disposed between the base and top sections wherein the absorber material comprises a hydrogel and a synthetic polymer that is configured to absorb the liquid cooling fluid and a dispersant, and the absorber material is configured to change from liquid form to granular form when subjected to a temperature exceeding 100° C., and the hydrophilic barrier is configured to retain the mixture of the liquid cooling fluid and absorber material in the base section while allowing the cooling fluid and a vapor of the liquid cooling fluid to pass therethrough to allow cooling the hot hydrocarbon fuel; and
    returning the cooled hydrocarbon fuel to the aircraft.

11. The method of claim 10, wherein the liquid cooling fluid comprises water.

12. The method of claim 11, wherein the liquid cooling fluid further comprises ammonia.

13. The method of claim 11, wherein the liquid cooling fluid further comprises methanol.

14. The method of claim 10, wherein the absorber material comprises sodium polyacrylate.

15. The method of claim 10, wherein the absorber material comprises acrylate and cellulose.

16. The method of claim 10, wherein the boiler further comprises a vent disposed in the top section.

17. The method of claim 10, further comprising subjecting the boiler to aircraft maneuvers.

18. The method of claim 10, further comprising subjecting the liquid cooling fluid to a boiling temperature of the cooling fluid.

\* \* \* \* \*